A. DEWINSKY.
SLED.
APPLICATION FILED MAY 25, 1914.
1,121,811.
Patented Dec. 22, 1914.
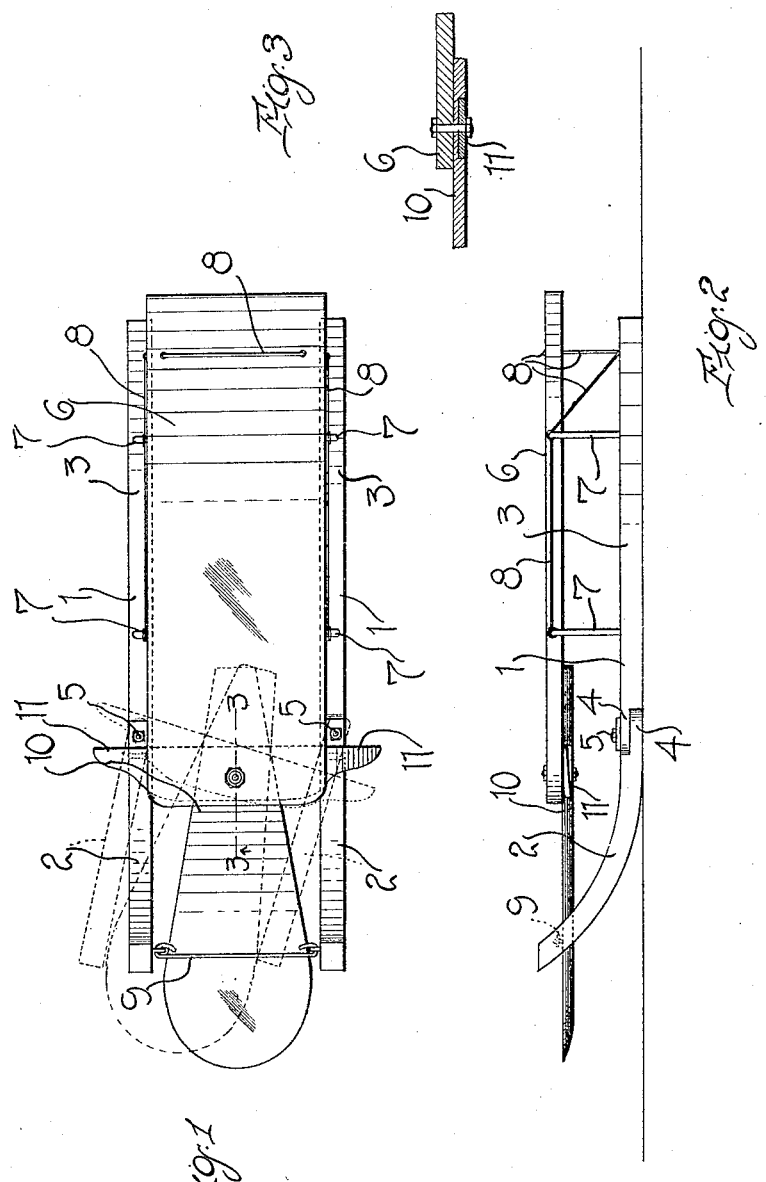
Inventor
AARON DEWINSKY
Witnesses
Robert M. Sutphen.
A. I. Hind.
By Watson E. Coleman
Attorney

UNITED STATES PATENT OFFICE.

AARON DEWINSKY, OF BETHLEHEM, PENNSYLVANIA.

SLED.

1,121,811.         Specification of Letters Patent.     Patented Dec. 22, 1914.

Application filed May 25, 1914. Serial No. 840,882.

*To all whom it may concern:*

Be it known that I, AARON DEWINSKY, a naturalized citizen of the United States, residing at Bethlehem, in the county of Lehigh and State of Pennsylvania, have invented certain new and useful Improvements in Sleds, of which the following is a specification, reference being had to the accompanying drawings.

This invention relates to new and useful improvements in sleds, and more particularly to steering devices therefor.

An object of this invention is the provision of a sled including a body board and runners, each of the runners comprising a front section and a rear section, the front sections of the runners being suitably connected together, and means being carried by the body board for engagement between the forward sections of the runners to move the same at an angle to the longitudinal plane of the rear sections of the runners to turn the sled in either direction.

Another object of this invention is the provision of a sled of this character in which an improved operating member is pivotally connected to the under face of the body board of the sled, the member projecting forwardly between the forward sections of the runners, and the member being provided with a transversely extending handle which projects beyond the opposite side edges of the body board, whereby the operating member may be readily turned to engage either runner to turn the sled in any desired direction.

With these and other objects in view, my invention consists in the novel construction, combination, and arrangement of parts to be hereinafter more fully described, claimed, and illustrated in the accompanying drawing, in which, Figure 1 is a top plan view of my improved sled; Fig. 2 is a side elevational view thereof; and Fig. 3 is a sectional view on the line 3—3 of Fig. 1.

Referring more particularly to the drawing, the numeral 1 designates the runners of my improved sled, each of the runners comprising a front section 2 and a rear section 3, the sections of the runners being provided with reduced overlapping flanges 4 through which pins 5 are passed to pivotally connect the front sections of the runners to the rear sections thereof. Disposed above the rear sections 3 of the runners is the body board 6 of the sled, which is supported on and spaced from the runners by the bars or standards 7, the body board and the rear sections 3 of the runners being braced by suitable rods 8.

The forward sections 2 of the runners are curved upwardly, the free ends of the sections 2 being disposed above the plane of the board 6, and being connected together by a link 9. Pivotally connected to the under face of the board 6 at its forward end, is a steering arm 10, the forward end of which is enlarged and disposed between the forward ends of the sections 2 of the runners below the link 9, the steering arm being tapered from its enlarged forward end to the inner extremity thereof. Countersunk in the arm at its pivotal point, is a transversely extending handle 11 which projects beyond the opposite side edges of the board 6 by means of which the steering arm may be readily moved from side to side to engage the desired runner and turn the sled in any direction.

In the practical use of my improved sled, the person using the sled places his feet or hands upon the oppositely projecting ends of the handle 11 and when it is desired to turn or steer the sled, the proper end of the handle is moved forwardly to turn the steering arm 10 in the desired direction, the steering arm engaging the forward end of the runner to turn the same at an angle to the longitudinal plane of the inner sections of the runners.

From the above description, taken in connection with the accompanying drawing, it will be seen that I have provided an improved sled which is formed with sectional runners, the body board of the sled being supported upon the rear sections of the runners, whereby the front sections thereof may be readily turned to steer the sled.

While the construction illustrated in the accompanying drawing is the preferred embodiment of my invention, it will be understood that minor changes in the construction may be resorted to without departing from the spirit of my invention or sacrificing any of its advantages as determined by the scope of the appended claim.

Having thus fully described my invention, what I desire to claim and secure by Letters Patent, is:—

A sled comprising spaced parallel runners, each of said runners including a front section and a rear section pivotally connected together, a body board carried by the rear sections of the runners, a link connecting the front sections of the runners, an inwardly tapered steering arm pivotally connected at its inner end to the body board, the outer end of said steering arm being loosely disposed between the front sections of the runners, and means for operating said steering arm.

In testimony whereof I hereunto affix my signature in the presence of two witnesses.

AARON DEWINSKY.

Witnesses:
 JOHN D. WOLLE,
 F. J. HAUS.

Copies of this patent may be obtained for five cents each, by addressing the "Commissioner of Patents, Washington, D. C."